United States Patent

[11] 3,629,614

[72] Inventor Raymond W. Matthews, Jr.
28 Bernard Lane, Commack, N.Y. 11725
[21] Appl. No. 793,020
[22] Filed Jan. 22, 1969
[45] Patented Dec. 21, 1971

[54] PARALLEL CONNECTED CONTROLLED RECTIFIER SWITCHING CIRCUIT
3 Claims, 1 Drawing Fig.
[52] U.S. Cl. .................................................. 307/252, 307/223, 307/242, 307/305
[51] Int. Cl. .................................................. H03k 17/00
[50] Field of Search .......................................... 307/223, 252, 305, 242

[56] References Cited
UNITED STATES PATENTS
3,217,185  11/1965  Jansons .......................... 307/223
3,317,751  5/1967  Libby et al. ..................... 307/223 X Primary Examiner—Donald D. Forrer
Assistant Examiner—John Zazworsky
Attorney—Eliot S. Gerber ABSTRACT: A switching system is constructed using a plurality of modules. Each module controls the power to a separate load and includes a capacitor, a silicon controlled rectifier, and a switch. In each module the gate of each of the controlled rectifiers is connected, through a switch, to a common lead line which line is also connected to one side of the capacitor.

PATENTED DEC 21 1971 3,629,614
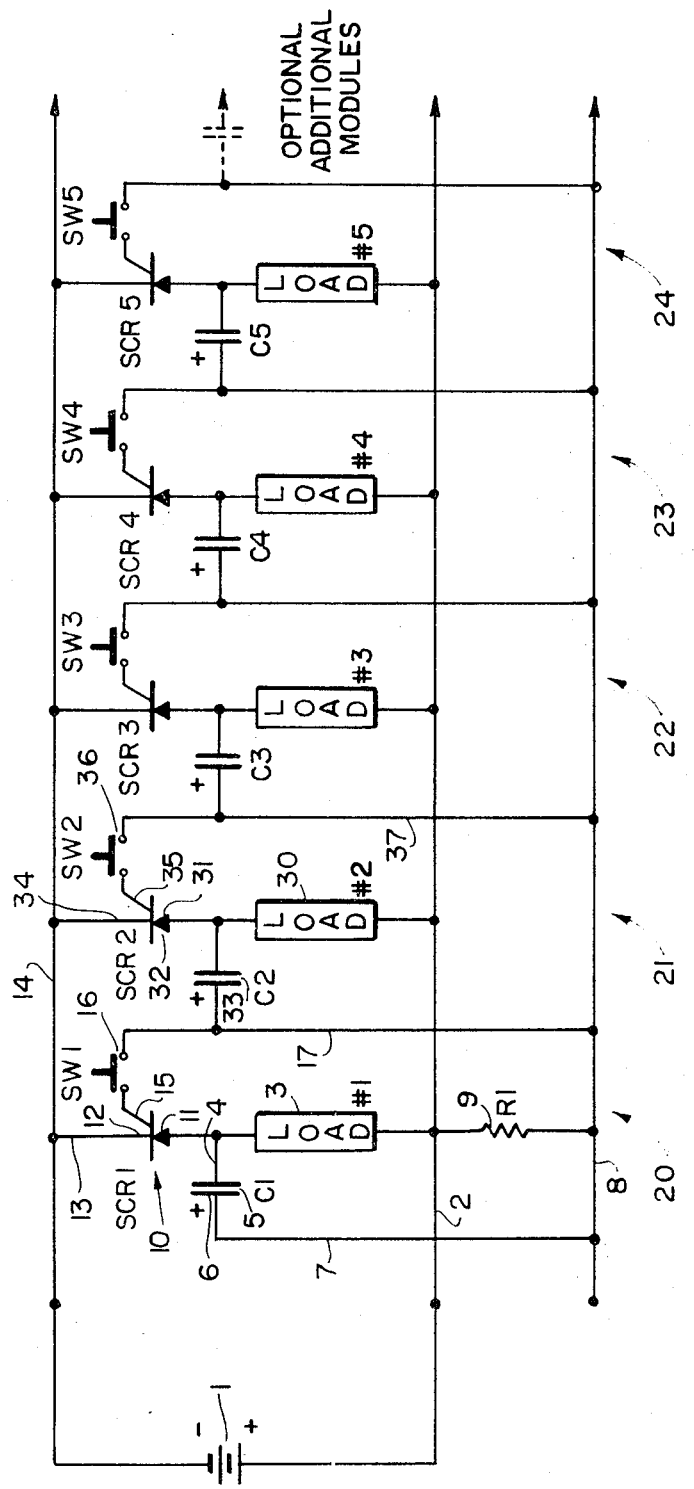
INVENTOR.
RAYMOND W. MATTHEWS, JR.
BY Eliot S. Gerber
ATTORNEYS

PARALLEL CONNECTED CONTROLLED RECTIFIER SWITCHING CIRCUIT

DESCRIPTION

The present invention relates to a control or switching circuit and, in particular, to such a circuit which is operated by a plurality of switches and which is adapted to be connected to a plurality of loads.

It is sometimes desirable in switching that a single system control the switching to a plurality of loads; for example, the loads may be portions of an audio system. Each load is controlled by its individual switch, which may be a mechanically operated, normally open, momentarily closed switch. It is desirable that turning on of power to any one load should turn off the power to the other loads in the system. In the past, this type of switching system has involved a manually operated set of switches which may be ganged together. Such systems, however, have been relatively cumbersome, expensive, and have lacked flexibility in the sense that other loads and switches could not readily be connected or disconnected from the system.

It is the objective of the present invention to provide a switching system for a plurality of loads which is composed of modules so that the system may have additional loads added to or subtracted from the system.

It is another objective of the present invention that the switching system be relatively inexpensive and rugged.

It is a further objective of the present invention that the switching system provide a plurality of switches in which the switching operation providing power to any one load of the system has the effect, instantaneously, of turning off the power to the other loads in the system.

It is still a further objective of the present invention that all the switches of the system are, in effect, opened upon the shutting down of the power to the system, providing for a recycle.

It is still a further objective of the present invention to provide a switching system in which the operable switches may be remote from their loads.

In accordance with the present invention, a switching control system which is adapted to be applied to a plurality of loads is provided. The system provides a group of modules which may be connected together and which may be added to or subtracted from the overall system. Each module controls the power to an individual load. Each load is connected from the power source, for example, positive DC current, through the anode and cathode of a silicon controlled rectifier. In each module: (1) the gate of the silicon controlled rectifier is connected, through a normally open switch to a common line, and (2) the common line is also connected to one side of a capacitor whose other side is connected to the load.

The present invention will be described in connection with the single accompanying drawing and the following description of the best mode of carrying the invention into operation, the single figure of the drawing being a schematic circuit diagram of a control system embodying the invention.

Referring to the drawing, the invention is illustrated as being embodied in a switching control circuit. The circuit includes a source of power 1, which is shown as being a direct current power source. Alternatively, the source 1 may be an AC power line. The positive, or "hot," terminal of source 1 is connected by line 2 to the input terminal of the first load 3. Each of the loads may be, for example, an audio or light system or any other load utilizing a controlled power and may be different types of such loads. The opposite terminal of the load is connected to the first terminal 4 of a capacitor 5. The opposite terminal 6 of the capacitor 5 is connected to a line 7 which, in turn, is connected to a common control line 8. A resistor 9 connects the line 2 to a common control line 8 to provide a certain bias to line 8, and consequently to the capacitor 5. The load 3 and the terminal 4 of capacitor 5 are connected to the anode 11 of a silicon-controlled rectifier 10. A silicon-controlled rectifier (SCR) is a PNPN-structure with three semiconductor regions available. The term, as used herein, includes devices (SCS) having four regions so available. The cathode 12 of the silicon controlled rectifier 10 is connected to line 13. Line 13 is connected to line 14 which is connected to the negative terminal of source 1. The gate 15 of the silicon-controlled rectifier is connected to one terminal of a switch, for example, a relay or a manually operated normally open switch. The switch, which may be spring-loaded, is only closed for a moment. The other terminal of the switch 16 is connected to the common line 8. This completes the elements required for a single module 20 of the control system.

The next module 21 is comprised of exactly the same types of components, except that the resistor 9 is omitted. The components of the second module 21 include a load 30 whose input terminal is connected to the line 2 and whose output terminal is connected to the anode 31 of the silicon-controlled rectifier 32. The output terminal of load 30 is also connected to one side of the capacitor 33. The other side of the capacitor 33 is connected to line 17. Line 17 is connected to common line 8 and to switch 16. The cathode 34 of the silicon-controlled rectifier 32 is connected to the line 14, which is connected to the negative side of the power source. The gate 35 is connected to one terminal of the switch 36, the other terminal of the switch 36 being connected by line 37 to the common line 8. As shown, the modules 22, 23 and 24 are exact replicas as to their components as the components of the module 21. It will be noted that each module controls the power to an individual and separate load.

The following electrical values are given by way of example only and may be used in each of the modules. The SCR is General Electric Type C20, resistor 9 is 100 ohms, the capacitors are 20 mf. and the loads may be in the range of 80 ma. to 250 ma. The switches 16 and 36, and the other switches, may be together, for example, on a board, and remote from their loads and associated components.

A typical application for the switching system is in audio switching. This application uses the system to turn on light-sensitive resistors controlling the path of various audio signals. When one audio function is to be selected at a location, the operator turns on the light-sensitive resistor associated with that function and turns all others off.

In operation, when power is applied, all SCR's are nonconductive. All the condensers are in a discharged state. Upon the momentary closure of any of the switches, a positive voltage from supply through R1 on line 8 passes through gate cathode path of that switch's associated SCR, turning on that switch's SCR. Once it is turned on, it stays on until (1) power is removed, or (2) voltage is applied to reverse-bias it. The condenser connected to the turned-on SCR anode now charges up to the polarity indicated, as now the anode of that SCR is negative with respect to positive of the source. At the closure of another SCR's switch to turn its SCR on and previous ones off, the charged condenser(s) is now connected to the negative terminal of source 1. This now reverse-biases its associated SCR, turning it off. After the momentary closure of the switch takes place and the switch opens, all condensers connected to the turned-on SCR anodes recharge, waiting for another operation.

I claim:

1. A switching circuit to switch power from a power source having first and second terminals to a plurality of loads each having an input and an output terminal, said circuit consisting of at least two modules;

the first module including a first line connected to the first terminal of the power source and to the input terminal of the first load;

a second line; a third line connected to the second terminal of the power source, a resistor between said first and second lines; a capacitor connected between the second line and the output terminal of the first load; a controlled rectifier having an anode, cathode and a gate, the anode being connected to the output terminal of the first load and the cathode being connected to the third line; and a switch having two terminals and an operating means, one terminal of the switch being connected to the gate and its other terminal being connected to the second line;

the second module including a capacitor connected between said second line and the output terminal of the second load; a controlled rectifier having an anode, cathode and a gate, the anode being connected to the output terminal of the second load and the cathode being connected to said third line; and a switch having two terminals and an operating means, one terminal of the switch being connected to the gate and its other terminal being connected to said second line.

2. A switching circuit as in claim 1 and also including a third module, the third module including a capacitor connected between said second line and the output terminal of the third load; a controlled rectifier having an anode, cathode and a gate, the anode being connected to the output terminal of the third load and the cathode being connected to said third line; and a switch having two terminals and an operating means, one terminal of the switch being connected to the gate and its other terminal being connected to said second line.

3. A switching circuit as in claim 1 wherein each of the switches is a normally open spring-loaded manually operated switch.

* * * * *